United States Patent
Nicol

(10) Patent No.: US 11,528,288 B2
(45) Date of Patent: Dec. 13, 2022

(54) SERVICE INFRASTRUCTURE AND METHODS OF PREDICTING AND DETECTING POTENTIAL ANOMALIES AT THE SERVICE INFRASTRUCTURE

(71) Applicant: OVH, Roubaix (FR)

(72) Inventor: Olivier Nicol, Tourcoing (FR)

(73) Assignee: OVH, Roubaix (FR)

( * ) Notice: Subject to any disclaimer, the term of this patent is extended or adjusted under 35 U.S.C. 154(b) by 79 days.

(21) Appl. No.: 16/691,475

(22) Filed: Nov. 21, 2019

(65) Prior Publication Data

US 2020/0177609 A1 Jun. 4, 2020

(30) Foreign Application Priority Data

Nov. 30, 2018 (EP) .................................. 18315048

(51) Int. Cl.
*H04L 9/40* (2022.01)
*G06F 16/903* (2019.01)

(52) U.S. Cl.
CPC .... *H04L 63/1425* (2013.01); *G06F 16/90344* (2019.01); *H04L 63/0245* (2013.01);
(Continued)

(58) Field of Classification Search
CPC ............. G06F 16/90344; G06F 21/552; G06F 11/0709; G06F 11/0775; G06F 11/0787; G06F 11/079; H04L 63/0245; H04L 63/1433; H04L 63/1441; H04L 63/20; H04L 63/1425; H04L 63/1416; H04L 63/1408; H04L 63/10; H04L 63/14; H04W 12/12
See application file for complete search history.

(56) References Cited

U.S. PATENT DOCUMENTS 6,321,338 B1 11/2001 Porras et al.
7,593,013 B2 9/2009 Agutter et al.
(Continued)

OTHER PUBLICATIONS

Lv et al., "Detection of Malicious Domain Names Based on Hidden Markov Model," 2018 IEEE Third International Conference on Data Science in Cyberspace (DSC) Year: 2018 | Conference Paper | Publisher: IEEE.*

(Continued)

*Primary Examiner* — Roderick Tolentino
(74) *Attorney, Agent, or Firm* — BCF LLP

(57) ABSTRACT

Methods allow a predicting and detecting potential anomalies at a service infrastructure. A strings table having entries that define character strings and corresponding anomaly probabilities is accessed. A log entry related to an event occurring in the service infrastructure is generated in a database. The log entry includes a character string designating a name of a file or an IP address and a domain name hosted by the service infrastructure. A search is made for the character string in the strings table. The domain name is marked as suspect if the character string is found in the strings table and if an anomaly probability for the character string exceeds a predetermined threshold. The anomaly probabilities may be calculated using a Bayesian filter that accounts for a number of domains hosted by the service infrastructure on which the character string has recently appeared.

21 Claims, 8 Drawing Sheets

(52) U.S. Cl.
CPC ...... *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 7,594,266 | B2 | 9/2009 | Mattsson et al. |
| 8,561,188 | B1 * | 10/2013 | Wang ................. H04L 63/1425 726/22 |
| 9,043,894 | B1 | 5/2015 | Dennison et al. |
| 9,503,470 | B2 | 11/2016 | Gertner et al. |
| 9,516,053 | B1 | 12/2016 | Muddu et al. |
| 9,519,781 | B2 | 12/2016 | Golshan et al. |
| 9,740,858 | B1 * | 8/2017 | Wu ....................... G06F 21/566 |
| 9,813,310 | B1 | 11/2017 | Sieracki |
| 10,887,333 | B1 * | 1/2021 | Pereira ................ H04L 63/0263 |
| 2004/0193943 | A1 | 9/2004 | Angeling et al. |
| 2016/0246844 | A1 | 8/2016 | Turner |
| 2017/0013005 | A1 * | 1/2017 | Galula .................... H04L 63/20 |
| 2017/0228658 | A1 * | 8/2017 | Lim ........................ H04L 63/14 |
| 2017/0316202 | A1 * | 11/2017 | Roichman ............. G06F 21/577 |
| 2018/0069883 | A1 * | 3/2018 | Meshi ..................... G06N 20/00 |
| 2018/0077120 | A1 * | 3/2018 | Baughman .......... H04L 63/1408 |
| 2018/0124110 | A1 | 5/2018 | Hunt et al. |
| 2019/0052658 | A1 * | 2/2019 | Clarke ................ H04L 63/1425 |

OTHER PUBLICATIONS

Spaulding et al., "Proactive detection of algorithmically generated malicious domains," 2018 International Conference on Information Networking (ICOIN) Year: 2018 | Conference Paper | Publisher: IEEE.*

Extented European Search Report with regard to the counterpart EP Patent Application No. 18315048.1 completed Apr. 16, 2019.

Buczak et al., "A Survey of Data Mining and Machine Learning Methods for Cyber Security Intrusion Detection", IEEE Communications Surveys & Tutorials, vol. 18, No. 2, 2016, pp. 1153-1176.

Sperotto, "Flow-Based Intrusion Detection", Proceedings of the 12th IFIP/IEEE International Symposium on Integrated Network Management, Dublin, Ireland, 2011, 192 pages.

Zhanpei et al., "Big-Data Analysis of Multi-Source Logs for Anomaly Detection on Network-based System", 2017 13th EEE Conference on Automation Science and Engineering (CASE), Xi'an, China, 2017, pp. 1136-1141.

Chou, "Ensemble Fuzzy Belief Intrusion Detection Design", Florida International University FIU Digital Commons, 2007, FIU Electronic Theses and Dissertations. 6, http://digitalcommons.fiu.edu/etd/6, 184 pages.

Kruegel et al., "A multi-model approach to the detection of web-based attacks", Computer Networks, vol. 48, 2005, pp. 717-738.

Wikipedia, "Recursive Bayesian estimation", https://en.wikipedia.org/wiki/Recursive_Bayesian_estimation, accessed Aug. 31, 2018, 4 pages.

Kruegel et al., "Bayesian Event Classification for Intrusion Detection", Proceedings of the 19th Annual Computer Security Applications Conference (ACSAC 2003), 2003, 10 pages.

Du et al., "DeepLog: Anomaly Detection and Diagnosis from System Logs through Deep Learning", CCS'17, 2017, Dallas, USA, Session F2: Insights from Log(in)s, pp. 1285-1298.

Cho et al., "SAD: web session anomaly detection based on parameter estimation", Computers & Security, vol. 23, 2004, pp. 312-319.

He et al., "Experience Report: System Log Analysis for Anomaly Detection", 2016 IEEE 27th International Symposium an Software Reliability Engineering, 2016, pp. 207-218.

https://docs.datadoghq.com/monitors/—accessed Aug. 31, 2018, pdf 2 pages.

* cited by examiner

400

440 — REPOPULATE THE STRINGS TABLE ACCORDING TO THE UPDATED TIMEFRAME OF INTEREST

442 — FOR EACH DELETED ENTRY OF THE DOMAINS TABLE, DECREMENT IN THE STRINGS TABLE A NUMBER OF DOMAINS THAT ARE ASSOCIATED WITH A CHARACTER STRING PRESENT IN THE DELETED ENTRY AND IN WHICH THERE HAS BEEN AN ANOMALY IN THE TIMEFRAME OF INTEREST IF AN ENTRY OF THE ANOMALIES TABLE FOR A DOMAIN NAME PRESENT IN THE DELETED ENTRY OF THE DOMAINS TABLE INDICATES THAT AN ANOMALY IS FOUND IN THE TIMEFRAME OF INTEREST FOR THAT DOMAIN NAME

444 — FOR EACH DELETED ENTRY OF THE DOMAINS TABLE, DECREMENT IN THE STRINGS TABLE A NUMBER OF DOMAINS THAT ARE ASSOCIATED WITH THE CHARACTER STRING PRESENT IN THE DELETED ENTRY AND IN WHICH THERE HAS BEEN NO ANOMALY IN THE TIMEFRAME OF INTEREST IF THERE IS NO ENTRY OF THE ANOMALIES TABLE FOR THE DOMAIN NAME PRESENT IN THE DELETED ENTRY OF THE DOMAINS TABLE

446 — SCAN THE DOMAINS TABLE TO LOCATE ENTRIES THAT CONTAIN A DOMAIN NAME EXTRACTED FROM EACH DELETED ENTRY OF THE ANOMALIES TABLE AND, FOR A LOCATED CHARACTER STRING OF EACH LOCATED ENTRY OF THE DOMAINS TABLE, DECREMENT IN THE STRINGS TABLE A NUMBER OF DOMAINS THAT ARE ASSOCIATED WITH THE LOCATED CHARACTER STRING PRESENT IN THE DELETED ENTRY OF THE DOMAINS TABLE AND IN WHICH THERE HAS BEEN AN ANOMALY IN THE TIMEFRAME OF INTEREST AND INCREMENT IN THE STRINGS TABLE A NUMBER OF DOMAINS THAT ARE ASSOCIATED WITH THE LOCATED CHARACTER STRING PRESENT IN THE DELETED ENTRY OF THE DOMAINS TABLE AND IN WHICH THERE HAS BEEN NO ANOMALY IN THE TIMEFRAME OF INTEREST

450 — RECALCULATE, FOR EACH CHARACTER STRING ASSOCIATED WITH ONE OR MORE OF THE DELETED ENTRIES OF THE DOMAINS TABLE, THE ANOMALY PROBABILITY BASED ON THE SAME PARAMETERS AS THEY NOW STAND

END — 460

*FIG. 4B*

SERVICE INFRASTRUCTURE AND METHODS OF PREDICTING AND DETECTING POTENTIAL ANOMALIES AT THE SERVICE INFRASTRUCTURE

CROSS-REFERENCE

The present application claims priority from European Patent Application No. 18315048.1, filed Nov. 30, 2018, the entirety of which is incorporated herein by reference.

FIELD

The present technology relates to systems and methods of Internet security. In particular, methods allow a service infrastructure to predict and detect potential anomalies at the service infrastructure.

BACKGROUND

Data centers and cloud infrastructure integrate many servers to provide mutualized hosting services to large numbers of clients. Data centers may include hundreds of thousands of servers and host millions of domains for their clients. Among those servers, file transfer protocol (FTP) servers are used to transfer data, software and other information elements from the clients for storage on the infrastructure. Generally speaking, a domain is associated with an FTP server, although a given FTP server may serve more than one domain, depending on the capacity of this server. Although extremely useful, the file transfer protocol has known security issues.

Data centers and cloud infrastructures are frequently victims of abuses such as, for example, malwares that are wrongfully installed on domains hosted by these systems and that cause spam, copyright infringement or phishing. Although not the sole point of entry of malwares into data centers, FTP servers are sometimes used by malicious third parties to install malwares on the hosted domains. A particular difficulty in preventing abuses of an infrastructure is related to the fact that data center operators are generally not allowed to examine the contents of client data received on the FTP servers. In addition to abuses committed by third parties having no established relationship with the owner of the infrastructure, it has also been observed that some clients of a data center have been attempting to use FTP security deficiencies to get access to parts of the infrastructure beyond their legitimate content or space.

Significant damage may follow the installation of a malware on the infrastructure. For example, when a malware is installed by a third party in the domain of a legitimate client, the malware may cause anomalies, for example by sending spam emails. Such anomalies are sometimes detected by other instances outside the infrastructure. These other instances may internally place that legitimate client on a black list, depriving the legitimate client of some services. Even worse, it is customary for clients to purchase ranges of contiguous IP addresses. The instances that may place a legitimate client on a black list may actually block an entire range of IP addresses.

In addition to abuses, other types of anomalies may impact the operation of data centers and cloud infrastructures. Types of anomalies that may occur and be detected include, without limitation, crash of an operating system, failure of a hardware component such as a server or a router, and the like.

Logs of activity on infrastructure equipment have been parsed in attempts to identify past abuses and to build malware databases. However, no solution exists allowing an automatic detection of signals that are precursors to an anomaly on the infrastructure. In fact, it is believed that a minority of anomalies, in particular a minority of abuses, are actually detected with sufficient rapidity to timely enforce corrective measures.

Another related problem is that blocking over the long term information related to a malware is not necessarily a viable solution. For example, a malicious party may acquire an IP address and use it to install a malware. The malicious party may then release that IP address, which may later be acquired by a legitimate party. Permanently blocking that IP address could deprive the legitimate party of service.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise difficulties in identifying causes of anomalies, including abuses, that may impact a service infrastructure, and inability to timely enforce corrective measures due to delays in discovering anomalies.

In one aspect, various implementations of the present technology provide a method of detecting potential anomalies at a service infrastructure, comprising:
  accessing a strings table, each respective entry of the strings table defining a respective character string and a respective anomaly probability for the character string;
  generating, in a database of the service infrastructure, a log entry related to an event occurring in the service infrastructure, the log entry including a character string designating one of a name of a file and an IP address, the log entry including a domain name hosted by the service infrastructure;
  searching for the character string in the strings table; and
  if the character string is found in the strings table and if an anomaly probability corresponding to the character string exceeds a predetermined threshold, marking the domain name as suspect.

In some implementations of the present technology, the method further comprises populating a domains table, each given entry of the domains table containing a given domain name, a given character string associated with the given domain name in a timeframe of interest, and a given association time corresponding to a latest association time among all log entries that associate the given domain with the given character string.

In some implementations of the present technology, populating the domains table comprises parsing a plurality of log entries in the database to extract, from each log entry, a respective domain name, a respective character string and a respective association time.

In some implementations of the present technology, each respective entry of the strings table further defines (i) a respective number of domains that are associated with the respective character string and in which there has been an anomaly in the timeframe of interest and (ii) a respective number of domains that are associated with the respective character string and in which there has been no anomaly in the timeframe of interest.

In some implementations of the present technology, the method further comprises determining, at the service infrastructure, that an anomaly has occurred at a detection time in relation to an impacted domain; accessing an anomalies table, each entry of the anomalies table including a name of a domain in which an anomaly has been detected in the timeframe of interest and a corresponding anomaly time; if an anomalies table entry exists for the impacted domain, updating the corresponding anomaly time in the anomalies table entry with the detection time; and if no anomalies table entry exists for the impacted domain: creating a new anomalies table entry for the impacted domain, the new anomalies table entry including the name of the impacted domain and the detection time, extracting from the domains table a list of character strings associated with the impacted domain, incrementing, in the strings table, for each character string of the list of character strings associated with the impacted domain, a number of domains that are associated with that character string and in which there has been an anomaly in the timeframe of interest, and decrementing, in the strings table, for each character string of the list of character strings associated with the impacted domain, a number of domains that are associated with that character string and in which there has been no anomaly in the timeframe of interest.

In some implementations of the present technology, the method further comprises periodically updating the timeframe of interest so that it extends from a predetermined duration in the past until the present time; and following the updating of the timeframe of interest: deleting entries of the domains table in which the association time predates the timeframe of interest, deleting entries of the anomalies table in which the anomaly time predates the timeframe of interest, and repopulating the strings table according to the updated timeframe of interest.

In some implementations of the present technology, repopulating the strings table according to the updated timeframe of interest comprises: for each deleted entry of the domains table: decrementing in the strings table a number of domains that are associated with a character string present in the deleted entry and in which there has been an anomaly in the timeframe of interest if an entry of the anomalies table for a domain name present in the deleted entry of the domains table indicates that an anomaly is found in the timeframe of interest for that domain name, decrementing in the strings table a number of domains that are associated with the character string present in the deleted entry and in which there has been no anomaly in the timeframe of interest if there is no entry of the anomalies table for the domain name present in the deleted entry of the domains table; and scanning the domains table to locate entries that contain a domain name extracted from each deleted entry of the anomalies table; and for a located character string of each located entry of the domains table: decrementing in the strings table a number of domains that are associated with the located character string present in the deleted entry of the domains table and in which there has been an anomaly in the timeframe of interest, and incrementing in the strings table a number of domains that are associated with the located character string present in the deleted entry of the domains table and in which there has been no anomaly in the timeframe of interest.

In some implementations of the present technology, the method further comprises calculating, for each respective entry of the strings table, the respective anomaly probability based on (i) the respective number of domains that are associated with the respective character string and in which there has been no anomaly in the timeframe of interest, (ii) the respective number of domains that are associated with the respective character string and in which there has been an anomaly in the timeframe of interest, (iii) a number of domains listed in the anomalies table, and (iv) a total number of domains hosted by the service infrastructure.

In some implementations of the present technology, each respective anomaly probability is calculated by applying a Bayesian filter to (i) the respective number of domains that are associated with the respective character string and in which there has been no anomaly in the timeframe of interest, (ii) the respective number of domains that are associated with the respective character string and in which there has been an anomaly in the timeframe of interest, (iii) the number of domains listed in the anomalies table, and (iv) the total number of domains hosted by the service infrastructure.

In some implementations of the present technology, the method further comprises calculating an aggregate probability of anomaly of the service infrastructure in relation to one of the domain names in the domains table by: calculating a logarithm of each of the anomaly probabilities for the character strings related to the one of the domain names; and combining the logarithms of each of the anomaly probabilities for the character strings related to the one of the domain names.

In some implementations of the present technology, the method further comprises calculating an aggregate probability of anomaly of the service infrastructure in relation to one of the domain names in the domains table by: calculating a first aggregate probability of anomaly of the service infrastructure on the one of the domain names for a first subset of the character strings related to the one of the domain names having highest anomaly probabilities; calculating a second aggregate probability of anomaly of the service infrastructure on the one of the domain names for a second subset of the character strings related to the one of the domain names having lowest anomaly probabilities; and combining the first and second aggregate probabilities.

In some implementations of the present technology, the domain name present in the generated log entry is unconditionally marked as not suspect if the aggregate probability of anomaly of the service infrastructure in relation to the domain name is lower than a predetermined threshold.

In some implementations of the present technology, the method further comprises following marking of the domain name as suspect, performing an action selected from the group consisting of discarding a received data packet related to the generation of the log entry, sending a message to a client related to the domain name, providing an alarm on the service infrastructure, blocking all data traffic related to the domain name, and a combination thereof.

In other aspects, various implementations of the present technology provide a method of predicting potential anomalies at a service infrastructure, comprising:

defining a strings table, each respective entry of the strings table defining (i) a respective character string, (ii) a respective number of domains hosted by the service infrastructure that are associated with the respective character string and in which there has been an anomaly in a timeframe of interest, (iii) a respective number of domains hosted by the service infrastructure that are associated with the respective character string and in which there has been no anomaly in the timeframe of interest, and (iv) a respective anomaly probability for the character string;

generating a plurality of log entries in a database of the service infrastructure, each log entry being related to an event occurring in the service infrastructure, each log entry associating a character string designating one of a name of a file and an IP address with a domain name hosted by the service infrastructure, each log entry also recording a specific association time;

parsing the plurality of log entries to populate a domains table, each given entry of the domains table containing a given domain name, a given character string associated with the given domain name in a timeframe of interest, and a given association time corresponding to a latest association time among all log entries that associate the given domain with the given character string;

detecting, at the service infrastructure, an anomaly occurring at a detection time in relation to an impacted domain;

accessing an anomalies table, each entry of the anomalies table including a name of a domain in which an anomaly has been detected in the timeframe of interest and a corresponding anomaly time;

if an anomalies table entry exists for the impacted domain, updating the corresponding anomaly time in the anomalies table entry with the detection time; and if no anomalies table entry exists for the impacted domain:

creating a new anomalies table entry for the impacted domain, the new anomalies table entry including the name of the impacted domain and the detection time, extracting from the domains table a list of character strings associated with the impacted domain, incrementing, in the strings table, for each character string of the list of character strings associated with the impacted domain, a number of domains that are associated with that character string and in which there has been an anomaly in the timeframe of interest, and decrementing, in the strings table, for each character string of the list of character strings associated with the impacted domain, a number of domains that are associated with that character string and in which there has been no anomaly in the timeframe of interest.

In other aspects, various implementations of the present technology provide a service infrastructure, comprising:

a server configured to receive data packets and/or commands from a client;

a database configured to store a plurality of log entries, each respective log entry of the log including a respective character string associated with a respective domain name;

a processor; and a memory device comprising a non-transitory computer-readable medium storing executable code thereon, the executable code comprising instructions for executing the method of detecting potential anomalies at the service infrastructure and/or the method of predicting potential anomalies at the service infrastructure when the executable code runs on the processor.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 4a and 4b are a sequence diagram showing operations of a method of updating a timeframe of interest for the service infrastructure in accordance with an embodiment of the present technology;

Figure 1:
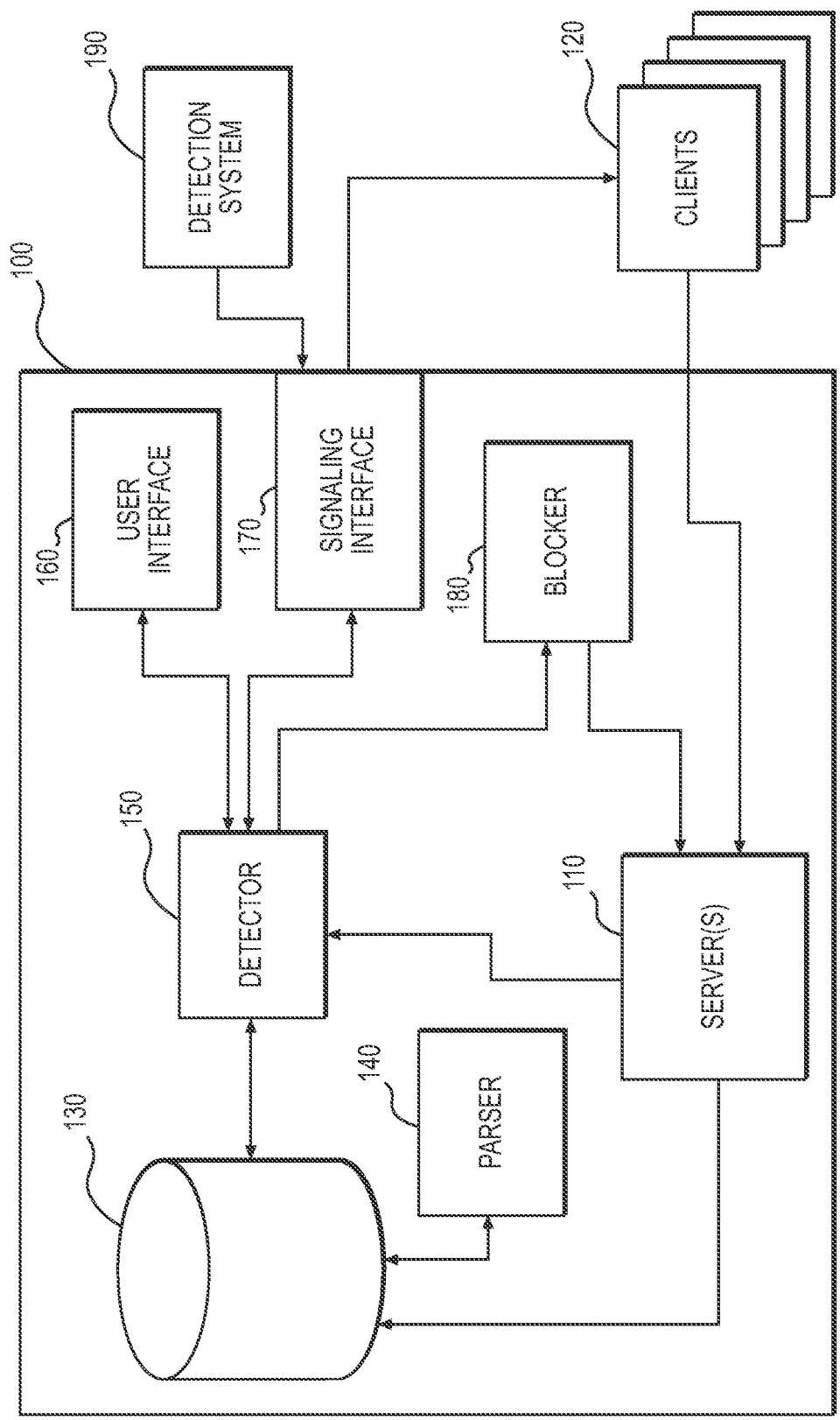
FIG. 1 illustrates a service infrastructure in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

The present technology addresses some of the problems caused by the lack of previous solutions for the automatic detection of signals that precede an anomaly of a service infrastructure. A technique is introduced whereby equipment logs, for example file transfer protocol (FTP) server logs, are stored in the service infrastructure and maintained on a periodical basis to cover a timeframe of interest, for example a period of one (1) month until the present. The logs may contain, for example, character strings identifying file names or IP addresses. An analysis is made to evaluate the probability of an anomaly. An anomaly is suspected when a character string related to a current event, for example a data packet or a command being received from a client or from a malicious party pretending to be the client, is found in a table, that character string being tagged in relation to an anomaly such as an abuse of a domain hosted by the service infrastructure. Otherwise stated, in an aspect, the present technology may rely on a similarity between data packets or commands received at the service infrastructure when some of these data packets or commands can be related to an anomaly that has occurred in a recent past. The technique thus comprises a learning function that allows correlating anomaly patterns over time. In particular, instead of searching for a specific cause of an anomaly, for example a malware or a failed router, the present technology attempts to identify users having recently been associated with anomalies, the users being identified by IP addresses or by file names contained in data packets or commands received from those users. Potential legitimate but erroneous commands entered by an operator of the service infrastructure or by external parties may also lead to anomalies that the present technology may detect. Although the examples presented herein mention data packets and commands, anomaly probabilities may be evaluated for other types of events that cause the generation of logs in the service infrastructure. Mentions of data packets and commands are made for illustration purposes and are not meant to reduce the generality of the present disclosure.

It is believed that a small minority of abuses are eventually detected, or detected with sufficient rapidity to timely enforce corrective measures. The learning function offered by the present technology allows to expand the scope of a search for anomalies and to rapidly detect potential anomalous events.

In one aspect of the present technology, a Bayesian filter may be used to calculate the probability of anomaly. Although false positive detections of anomaly may happen, the Bayesian filter accounts for the probability that a given character string may legitimately occur.

Automatically blocking a domain or an IP address might lead to blocking a legitimate user when their domain or IP address is used by a third party. This may not be possible for legal reasons in some jurisdictions, and in any case might damage the relationship between the owner of the infrastructure and the client. For that reason, in an embodiment, information about suspected anomalies may be provided on an operator interface instead of, or before, automatic blocking of a domain or of an IP address. Regardless, the present technology does incorporate, as an optional feature, the possibility to block the entity at the root of an anomaly.

FIG. 1 illustrates a service infrastructure 100 in accordance with an embodiment of the present technology. The service infrastructure 100 comprises a large number of servers 110 (only one is shown in order to simplify the illustration), for example FTP servers, that provide services to clients 120. The servers 110 are hosts to domains for the clients 120. The servers 110 generate logs that are stored in a database 130. Other components of the service infrastructure 100 include a parser 140, a detector 150, a user interface 160, a signaling interface 170, and a blocker 180. The parser 140 may parse logs stored in the database 130 and generate a table of results stored in the database 130. The detector 150 detects anomalies, either internally being informed by an external detection system 190. Using the table stored by the parser 140 in the database 130, the detector calculates anomaly probabilities that are stored in another table of the database 130. The detector 150 is also informed of data packets and commands, for example FTP commands, received at the servers 110 from the clients 120. The detector 150 identifies domains that may be considered as suspect in view of suspect information in received data packets or commands. The user interface 160 allows communication between the detector 150 and an operator of the service infrastructure 100. The signaling interface 170 allows the detector 150 to communicate with the clients 120 and with the external detection system 190.

In more details, the database 130 stores, for each server 110, a log that contains information about various events and activities of the server 110. Examples of such events and activities include commands received at the server 110, computations made at the server 110, and the like. Some log entries are generated when data packets or commands are received from the clients 120 at the server 110 or when other events occur over a timeframe of interest. The log entry may for example be stored in a plain text format. For each data packet or command received at the service infrastructure 100, an entry in the log may contain a date or a date and a time of the event, a domain hosted by the service infrastructure 100 that was the intended recipient of the data packet or command, a character string (or simply 'string') representing a name of a file included in the received data packet or command and/or a character string representing an IP address included in the received data packet or command.

The above mentioned tables include a "domains table", generated by the parser 140 and stored in the database 130, that provides information about occurrences of characters strings related to file names or IP addresses in data packets or commands received at the domains hosted by the service infrastructure 100 during the timeframe of interest, for example over a period extending from a month ago until the present time. The domains table may, for example, be populated by parsing the log of servers, for example FTP servers, that serve the domains hosted by the service infrastructure 100. The domains table may alternatively be updated in real-time as the service infrastructure 100 treats data traffic and commands. An example of the domains table is shown in Table I.

TABLE I

| Domain name | String | Date of last occurrence of the string |
|---|---|---|
| Domain1 | String_a | Aug. 26, 2018 |
| Domain1 | String_b | Sep. 11, 2018 |
| Domain1 | String_c | Sep. 22, 2018 |
| Domain2 | String_c | Sep. 25, 2018 |
| Domain2 | String_d | Sep. 20, 2018 |
| Domain3 | String_f | Sep. 25, 2018 |
| Domain4 | String_b | Sep. 14, 2018 |

Table I reflects the content of the domains table on Sep. 25, 2018. As shown on Table I, the domains table contains information related to the occurrence of various strings found in the log. Each entry (each row) of the domains table comprises three (3) related fields. A first field contains a domain name and second field contains a character string, the domain and the string being found in a common entry in the log. A third field contains a time value that may, in the illustrated example, be expressed as a "date of last occurrence of the string" on that domain. The time value may otherwise be expressed as a number of days since a last occurrence of that string on that domain, in which case each entry is regularly incremented, for example by one (1) day on a daily basis, so that the time since the last occurrence of the string is properly reflected. If a plurality of entries in the log includes the pair formed by the domain name and the character string, the most recent of those entries is used to populate the "date of last occurrence of the string" field in this entry of the domains table. Although only a few rows are shown on Table I, in a practical application, the number of domains would be much greater, for example hundreds or thousands or millions of domains, and the number of strings would be on the order of many millions or even billions of strings, for example. In an embodiment, a search for relevant information in the domains table is made using the domain name as a primary search key.

Entries that are older than a predetermined number of days corresponding to the timeframe of interest are deleted from the domains table. For example and without limitation, the predetermined number of days may be selected for deleting entries that are older than 30 days. Deleting from the domains table entries for strings that have not been related in the log to given domains in the course of the timeframe limits the overall number of entries that need to be maintained. The duration of the timeframe may be set considering that hackers who generate anomalies frequently modify their IP addresses and the names of their files in order to try to circumvent conventional Internet security solutions. Use of longer or shorter intervals, corresponding to a longer or shorter timeframe, for deleting entries from the domains table is contemplated. Although the duration of the timeframe may be expressed in days, a review of the domains table to delete entries that are no longer valid may be performed at a higher rate, for example once every few minutes, in order to spread over time the processing load related to deletion operations.

Table II is an example of an "anomalies table" generated by the detector 150 and stored in the database 130.

TABLE II

| Domain Name | Date of last anomaly |
|---|---|
| Domain1 | Sep. 15, 2018 |
| Domain2 | Sep. 25, 2018 |

TABLE II-continued

| Domain Name | Date of last anomaly |
|---|---|
| Domain4 | Aug. 26, 2018 |
| Domain5 | Sep. 3, 2018 |

Table II reflects the content of the anomalies table on Sep. 25, 2018. Each entry (each row) of the anomalies table contains a domain name field and a "date of last anomaly" field. In a variant, a time (i.e. hour) of the last anomaly on a given domain may also be inserted in the "date of last anomaly' field. In another variant, this field may indicate a number of days since an anomaly was detected for the given domain. In the example of Table II, the service infrastructure 100 serves five (5) domains named 'Domain1', 'Domain2', 'Domain3', 'Domain4' and 'Domain5'. There is no entry in the anomalies table for 'Domain3' because there has been no anomaly in relation to this domain in the timeframe of interest. As a background operation, entries that predate the timeframe may be deleted from the anomalies table on a regular basis, for example once a day. As in the case of the domains table, the number of entries in the anomalies table would be much larger in a practical application, the anomalies table having entries for hundreds, thousands or millions of domains. Even in a large datacenter hosting millions of domains, the anomalies table is fairly small in comparison with other tables and a search for a domain having been recently found to be anomalous is expected to be completed within a few milliseconds.

In the anomalies table, the number of entries denotes a number of domains in which an anomaly has been detected in the timeframe. A number of domains without anomaly may be inferred based on knowledge of a total number of domains hosted in the service infrastructure 100. As an alternative, the anomalies table may contain an entry for each domain hosted by the service infrastructure 100, in which case the "data of last anomaly" field for a given domain would be set to a Null value to indicate that no anomaly has been associated with that given domain within the timeframe.

Table III is a "strings table" generated by the detector 150 and stored in the database 130.

TABLE III

| String | Presence in domains without anomaly | Presence in domains with anomaly | $p'(A \backslash Str_i)$ |
|---|---|---|---|
| String_a | 106 | 58 | 0.935 |
| String_b | 58 | 22 | 0.905 |
| String_c | 45 | 17 | 0.893 |
| String_d | 1 | 4 | 0.882 |
| String_e | 50 | 15 | 0.871 |
| String_f | 1 | 0 | 0.000 |

Table III reflects the content of the strings table on Sep. 25, 2018. Each entry (each row) of the strings table includes a first field providing a string name, a second field showing a number of domains hosted in the service infrastructure 100 in which this string has been detected as a part of a received data packet or command and in which there was no anomaly during the timeframe, a third field showing a number of domains in which this string has been detected as a part of a received data packet or command and in which there was an anomaly during the timeframe, and a probability $p'(A\backslash Str_i)$ that an anomaly may occur on the service infrastructure 100, given that a character string $Str_i$ representing a file name or an IP address has been associated with at least one domain hosted on the service infrastructure 100 in the timeframe of interest. A manner of calculating the value $p'(A \backslash Str_i)$ is described hereinbelow. The number of entries in the strings table would be much larger in a practical application, the strings table having entries for up to billions of strings. The strings table is indexed by character string, not by date of creation. As such, searching for a particular string is done rapidly with modest processing effort.

The contents of the domains table may be updated by the parser 140 in the following manner. The parser 140 parses the log on a regular basis, for example and without limitation once a day, once per hour, or even on a continuous basis and virtually in real-time. For each association between a domain name and a string (i.e. an IP address or a file name), the parser 140 updates a corresponding entry of the domains table, or creates the entry if not previously present in the domains table. The field "date of last occurrence of the string" for a given entry is set to the actual date stored in the log; if more than one log entry is found for the same domain name and for the same string, the date of the most recent of these log entries is placed in the corresponding entry of the domains table.

When the parser 140 detects a new character string that was not previously part of the strings table, it creates a new entry in the domains table to associate the new character string with the name of a domain related to that character string, also adding the associating time in that new entry. The parser 140 also creates a new entry in the strings table. In this entry, the "Presence in domains without anomaly" field is initially set to one (1), the "Presence in domains with anomaly" field is initially set to zero (0), and the probability $p'(A \backslash Str_i)$ is initially set to zero (0).

Parsing of the log may be effected at a rapid rate for detecting new character strings that appear on the service infrastructure 100 and at a lower rate, for example once daily, for deleting entries of the domains table that are not longer within the timeframe of interest.

The same file name may lead to the generation of a plurality of entries. As a non-limiting example, the log may show that a 'PUT' FTP command was received requesting to store an image in a folder of a domain. The FTP command may read as follows: PUT my_image.jpg/www/img/my_nicest_pics/my_image.jpg This commands requests placing an image having a file name 'my_image' with an extension 'jpg' in a folder named 'my_nicest_pics' within a path '/www/img' for a domain owned by the issuer of the PUT command Each of 'www', 'img', 'my_nicest_pics', 'my_image.jpg' and 'my_image' may constitute a distinct string for which a distinct entry is placed in the domains table, for the same domain hosting the folder /www/img/my_nicest_pics/, each of these entries of the domains table having the same value in the "date of last occurrence of the string" field. Some modifications to the contents of the PUT command may be made in view of limiting the number of similar strings, for example replacing uppercase letters with lowercase letters, replacing consecutive blank spaces with a single blank space, and the like.

Continuing with this example, if the PUT command is received on Sep. 25, 2018, all entries are populated with that date in the "date of last occurrence of the string" field. If a similar command is received on the next day for the same domain, requesting the entry of 'my_photograph.jpg' in the same folder, new entries are created in the domains table for 'my_photograph.jpg' and for 'my_photograph', these entry being dated Sep. 26, 2018. The entries for 'www', 'img', 'my_nicest_pics' are now dated Sep. 26, 2018. The entries for 'my_image.jpg' and for 'my_image' remain dated Sep. 25, 2018.

An anomaly may be detected in real time by an entity of the service infrastructure 100 that receives information about this anomaly from an operator via the user interface 160, from a client 120 having detected the anomaly, from a batch process implemented in the detector 150, or from the detection system 190 communicating with the detector 150 via the signaling interface 170. Regardless of the manner in which the anomaly is detected, contents of Tables II and III are updated by the detector 150 to account for the new anomaly.

Referring to Table I, II and III, in a non-limiting example, an anomaly occurring on Sep. 25, 2018 is detected, the anomaly involving Domain2. The anomalies table is examined to determine if an entry exists for Domain2. If an entry exists, the "date of last anomaly" field is updated to Sep. 25, 2018 and no other action needs to be taken. If the anomalies table did not have an entry for Domain2, a new entry is created for Domain2 in the anomalies table. Then, the strings table is updated by (i) searching the domains table for all strings related to Domain2 (in the present example, Domain2 is related to String_c and String_d), (ii) decrementing in the strings table the "Presence in domains without anomaly" for each of String_c and String_d, and (iii) incrementing in the strings table the "Presence in domains with anomaly" for each of String_c and String_d. Although not required, the values (A|$Str_i$) for String_c and for String_d may optionally be updated at that time.

In another non-limiting example, String_f is found to be associated with Domain3 on Sep. 25, 2018. String_f is a new string that was not previously present in the domains table and in the strings table, which means that String_f had not appeared on the service infrastructure 100 during the timeframe. A new entry is created in the domains table for Domain3 and for String_f. A new entry is also created for String_f in the strings table. Given that the anomalies table shows that there has been no anomaly on Domain3 during the timeframe, the "Presence in domains without anomaly" for String_f is set to one (1) and the "Presence in domains with anomaly" is set to zero (0). This reflects that String_f is only related to Domain3 and that no anomaly has been detected in Domain3 during the timeframe. In case where String_f would have already been associated with Domain3 in the domains table, the only action would have been to update the date of that entry to Sep. 25, 2018.

In a further non-limiting example, the domains table is scanned on Sep. 26, 2018 and it is found that String_a has not been associated with Domain1 after Aug. 26, 2018, or 31 days ago. In the present example, the last occurrence of String_a in association with Domain1 exceeds the predetermined number of 30 days corresponding to the timeframe. The entry for Domain1 and String_a is deleted from the domains table. The anomalies table shows that an anomaly has been detected on Domain1 as recently as Sep. 15, 2018. String_a being no longer associated with Domain1, it is now associated with one less domain in which an anomaly has been detected. Consequently, the "Presence in domains with anomaly" for String_a is decremented by one (1). In case where no anomaly would have been detected on Domain1 within the timeframe, the "Presence in domains without anomaly" for String_a would decremented by one (1) instead.

Continuing with the above non-limiting example taking place on Sep. 26, 2018, the anomalies table is scanned and it is found that no anomaly has been found on Domain4 since Aug. 26, 2018, or 31 days ago, which in the present example exceeds the predetermined number of 30 days corresponding to the timeframe. The entry for Domain4 is deleted from the anomalies table. The domains table is scanned and it is noted that String_b has been associated with Domain4 on Sep. 14, 2018, which was less than the predetermined number of 30 days after the last anomaly on Domain4. In the strings table, the "Presence in domains with anomaly" for String_b reflected, until now, that String_b was present on Domain4 within a period in which an anomaly had been found on Domain4. In it now demonstrated that the presence of String_b on Domain4 on Sep. 14, 2018 was not related to any anomaly after Aug. 26, 2018. Given that no anomaly has been detected in Domain4 in the timeframe, String_b is now related to one less domain in which there has been an anomaly. Consequently, the "Presence in domains with anomaly" for String_b is decremented by one (1) and the "Presence in domains without anomaly" is incremented by one (1). This process is repeated for all strings that are related to Domain4 in the domains table and for all domains of the anomalies table that may show no anomaly in the timeframe.

Returning to the above example in which String_f is found to be associated with Domain3 on Sep. 25, 2018, in a case where no other data packet or command carrying String_f is received for any domain within the next 30 days, the entry connecting Domain4 and String_f will be deleted from the domains table on Oct. 25, 2018. At the same time, the entry for String_f will be deleted from the strings table, as the "Presence in domains without anomaly" would otherwise be decremented to zero (0) and the "Presence in domains with anomaly" would still be equal to zero (0). Generalizing this action, it may be shown that when a given string is no longer present in the domains table, a corresponding entry for the given string may be deleted from the strings table.

The calculation of the probability p'(A|$Str_i$) of the strings table may be performed using a Bayesian filter, as described hereinbelow.

At first, a probability p(A|$Str_i$) that an anomaly may occur on the service infrastructure 100, given that a character string $Str_i$ representing a file name or an IP address has been associated with at least one domain hosted on the service infrastructure 100 in the timeframe of interest, is calculated according to equation (1):

$$p(A \mid Str_i) = \frac{p(Str_i \mid A) \cdot p(A)}{p(Str_i \mid A) \cdot p(A) + p(Str_i \mid \overline{A}) \cdot p(\overline{A})} \quad (1)$$

wherein:
p(A) is a number of domains on which anomalies have occurred in the timeframe divided by a total number of domains;
p($\overline{A}$) is a number of domains on which anomalies have not occurred in the timeframe divided by a total number of domains;
p($Str_i$|A) is the probability that a character string $Str_i$ representing a file name or an IP address has been associated with a domain of the service infrastructure 100 in the timeframe, on a domain having generated an anomaly; and
p($Str_i$|$\overline{A}$) is the probability that a character string $Str_i$ representing a file name or an IP address has been associated with a domain of the service infrastructure 100 in the timeframe, on a domain having generated an anomaly.

In a non-limiting example, the anomalies table may show that the service infrastructure 100 hosts 1000 domains and that an anomaly has been detected in relation to 50 of those domains during the timeframe. p(A) is then equal to 0.050 and p($\overline{A}$) is then equal to 0.950. A given string $Str_i$ may be found in the domains table in association with 35 domains on which an anomaly has occurred and on 5 domains on which no anomaly has occurred. In that case p($Str_i$|A) is equal 35/50=0.700 and p($Str_i$|$\overline{A}$) is equal to 5/(1000−50)=0.0052. Using equation (1), the probability p(A|$Str_i$) for the given string $Str_i$ is then equal to 0.876, which means that there is an 87.6% chance that an anomaly will occur if the given string $Str_i$ is received at the service infrastructure 100.

In a variant, instead of calculating the values p(A) and p($\overline{A}$) based on the contents of the anomalies table, fixed values may be assigned. For example, setting p(A) equal to 0.100 and setting p($\overline{A}$) equal to 0.900 tends to increase the value of the probability p(A|$Str_i$) when the values p($Str_i$|A) and p($Str_i$|$\overline{A}$) are far apart. Using these fixed values with the above example, the probability p(A|$Str_i$) would become equal to 0.937, meaning that there is a 93.7% chance that an anomaly will occur if the given string $Str_i$ is received at the service infrastructure 100.

The calculation of the probability p(A|$Str_i$) using equation (1) may be impacted by the fact that some strings occur very infrequently. A string may occur only once in the timeframe and may be related to an anomalous event on the domain to which it is associated. That string may or may not have been related the cause of the anomaly. For that string, p($Str_i$|A) is equal to 1.000 and p($Str_i$|$\overline{A}$) is equal to 0.000. For any values of p(A) and of p($\overline{A}$), the probability p(A|$Str_i$) becomes 1.000, or 100%. A weighted probability may be calculated, using equation (2), to mitigate this effect:

$$p'(A|Str_i) = \frac{n_i \cdot P(A|Str_i)}{k+n_i} \qquad (2)$$

wherein:

$n_i$ is a number of distinct domains on which the character string $Str_i$ representing a file name or an IP address has been as associated, $n_i$ being equal to the sum of the "Presence in domains without anomaly" and of the "Presence in domains with anomaly" for that string; and k is a constant weighting parameter value.

Without limitation, it has been found that the weighting parameter value k may be set to three (3) with good results when the log is the log of an FTP server. Using the above example in which the given string $Str_i$ is associated with 35 domains on which an anomaly has occurred and with 5 domains on which no anomaly has occurred, $n_i$ being equal to 40 domains, the probability p(A|$Str_i$) is changed from 0.269 to 0.250, if real values are used for p(A) and for p($\overline{A}$), or from 0.438 to 0.407, if p(A) and p($\overline{A}$) are respectively set to fixed values of 0.100 and 0.900. The impact of using the weighting parameter value k is modest except in cases where the number $n_i$ of domains associated with the given string $Str_i$ is very small. Other the weighting parameter values may easily be selected for other applications, for example by trial and error.

The probability p(A|$Str_i$) or the weighted probability p'(A|$Str_i$) may be recalculated each time an entry is modified in the strings table, or may alternatively be recalculated to the entire the strings table at regular intervals, for example every few minutes.

In an embodiment, instead of deleting from Tables I, II and II information that predate the timeframe, it is possible to move the same data in further Tables for a number m of earlier timeframes. It becomes possible to extend the calculation of the probability that a domain generates anomaly over a longer period, using equation (3) or, equivalently, using equation (4):

$$p''(A|Str_i)_t = p'(A|Str_i)_t + \delta p'(A|Str_i)_{t-1} + \delta^2 p'(A|Str_i)_{t-2} + \delta^3 p'(A|Str_i)_{t-3} + \qquad (3)$$

$$p''(A|Str_i)_t = \rho_{n=0}{}^H \delta^m p'(A|Str_i)_{t-m} \qquad (4)$$

wherein:

p"(A|$Str_i$)$_t$ is a time weighted probability that an anomaly may occur on the service infrastructure 100, given that a character string $Str_i$ representing a file name or an IP address has been associated with at least one domain hosted on the service infrastructure 100 in the timeframe t or in one or more earlier timeframes t−m;

δ is an attenuation factor greater than 0 and less than 1 for multiplying the weighted probabilities p'(A|$Str_i$) calculated in the earlier timeframes t−m; and H is an integer number greater than or equal to 1 and designating a number m of earlier periods over which the weighted probability is calculated.

H therefore represents a time horizon over which the adjusted probability that a domain generates anomaly can be calculated. Using small values for δ, $\delta^m$ diminishes rapidly and H may for example be limited to a range between three (3) and five (5), for example between three (3) and five (5) earlier periods of one (1) month each.

In a variant, the contents of Tables I, II and III that become older than the timeframe may be copied into equivalent Tables I', II' and III' for the previous iterations, these tables being maintained in the service infrastructure 100 for a longer period, for example for a year, and be reused for the calculation of the time weighted probability p"(A|$Str_i$)$_t$. The content of these tables no longer changes. In another variant, current values for p(A|$Str_i$) or for p'(A|$Str_i$) may be stored in the service infrastructure 100 with a current date when performing operations to remove information that predates the timeframe of interest from Tables I, II and II.

Equations (1), (2), (3) and (4) provide various manners of calculating anomaly probabilities for a given character string $Str_i$ representing a file name or an IP address for a given domain. These probabilities may be aggregated in the following equation (5) in order to provide an overall probability of anomaly for a given domain D:

$$p(A|D) = \frac{\Pi^{i \in I_D} p'(A|Str_i)}{\Pi^{i \in I_D} p'(A|Str_i) + \Pi^{i \in I_D}(1 - p'(A|Str_i))} \qquad (5)$$

wherein:

$I_D$ is the totality of character strings $Str_i$ having been associated with a domain D in the timeframe; and p(A|D) is the aggregated probability of an anomaly affecting the domain D in the timeframe.

Although equation (5) as shown combines values of the weighted probabilities p'(A|$Str_i$), variants may combine values of the probabilities p(A|$Str_i$) or of the time weighted probabilities p"(A|$Str_i$).

The number of character strings $Str_i$ that may be associated with the domain D may be large. Although anomaly attempts may be frequent in the service infrastructure 100, the probability p'(A|Str$_i$) that any given string Str$_i$ may cause an anomaly is expected to be very small for a vast majority of the character strings. Computing the aggregated probability p(A|D) of equation (5) using floating point operations might lead to the various products in this equation becoming equal to zero (0) because many intermediate calculation results are rounded. To this end, in a variant, the aggregated probability p(A|D) of an anomaly affecting the domain D in the timeframe may be calculated using equations (6) and (7):

$$p(A|D) = \frac{1}{e^Q + 1} \quad (6)$$

wherein $$Q = \sum\nolimits^{i \in I_D} \left( \frac{1 - p'(A|Str_i)}{p'(A|Str_i)} \right) \quad (7)$$

In another variant, computational complexity may be reduced and rounding off of the calculations may be avoided by calculating the aggregated probability p(A|D) for a modest number of strings Str$_i$, for example a subset containing 20 strings, having the lowest (A|Str$_i$) values for a domain D and for another modest number of strings Str$_i$, for example a subset containing 20 strings, having the highest p'(A|Str$_i$) values for the domain D.

Figure 2:
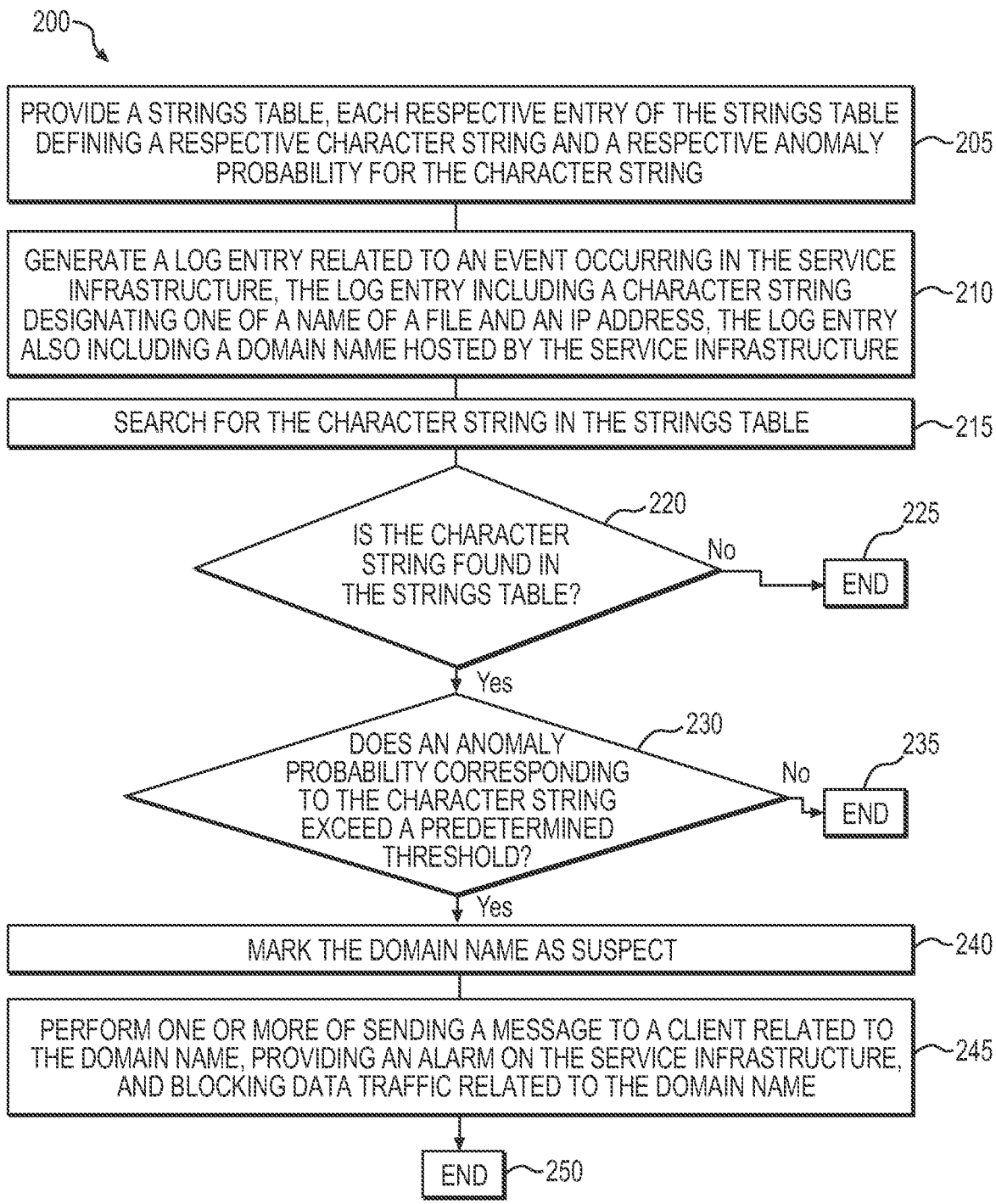
FIG. 2 is a sequence diagram showing operations of a method of detecting potential anomalies at a service infrastructure in accordance with an embodiment of the present technology.

FIG. 2 is a sequence diagram showing operations of a method of detecting potential anomalies at a service infrastructure in accordance with an embodiment of the present technology. FIG. 2 shows a sequence 200 comprising a plurality of operations that may be executed in variable order, some of the operations possibly being executed concurrently, some of the operations being optional. The sequence 200 may begin with operation 205 in which the detector 150 provides/accesses a strings table, in which each respective entry of the strings table defines a respective character string and a respective anomaly probability for the character string. Each respective entry of the strings table may further define a respective number of domains that are associated with the respective character string and in which there has been an anomaly in a timeframe of interest and a respective number of domains that are associated with the respective character string and in which there has been no anomaly in the timeframe of interest. A log entry is generated at operation 210. The log entry is related to an event occurring in the service infrastructure 100. Examples of events that may cause the generation of log entries include, without limitation, the receipt at the infrastructure 100 of a data packet or of a command, for example an FTP command. The log entry includes a character string designating one of a name of a file and an IP address included in the data packet, in the command, or in any other event having cause the generation of the log entry. The log entry also includes a domain name hosted by the service infrastructure 100, the domain name being associated to the event having cause the generation of the log entry.

The database 130 may contain a plurality of log entries, each log entry defining an association of a specific character string with a specific domain name, each log entry also recording a specific association time.

In an embodiment, a plurality of character strings may be present in the log entry generated at operation 210, each character string designating a distinct one of a name of a distinct file or IP address contained in the log entry. The following operations of the sequence 200 may be independently repeated for each character string present in the log entry.

Optionally, the domain name, the character string and the current time of generation of the log entry at operation 210 may be used to update the domains table, either by causing the creation of a new entry or by refreshing the data of last occurrence of the string if a corresponding entry was previously part of the domains table. If more than one character string is present in the log entry, a same number of entries may be updated or created in the domains table.

At operation 215, the strings table is accessed by the detector 150 and a search is made in the strings table for the character string (or, independently, for each character string extracted from the data packet or command) Operation 220 determines whether the character string is found in the log entry. If not, the sequence 200 ends at operation 225. If the character string is found in the strings table, the detector 150 determines at operation 230 whether an anomaly probability corresponding to the character string exceeds a predetermined threshold. The predetermined threshold may be a fixed or a variable threshold. A typical but non-limiting example of a fixed threshold may be set to 0.8, i.e. to a 80% probability that the character string is related to an anomaly.

Different threshold values may be used for different types of anomalies, including for example an abuse caused by a malware or a fault caused by a failure of a hardware component. The threshold may vary over time in view of a recently discovered abuse probability. For example, false positive detections may be avoided to a large extent by using a very high threshold. A lower threshold may be used when it is desired to more broadly identify potential anomalies. The operator of the service infrastructure 100 may modify the threshold using the user interface 160.

In an embodiment, the threshold may be calculated based on data accumulated from recent events occurring at the service infrastructure, using equation (8):

$$\text{Threshold} = \text{argmin}_x \left( \frac{\sum_{\text{stringeStrings}} I(p(A|Str_i) < x)}{m} > 0,95 \right) \quad (8)$$

wherein

I is the indicator function;

m is the number of entries in the strings table.

Equation (8) computes a minimum value x such that 95% of the anomaly probabilities are less than x (the 95% percentile). This 95% ratio may be reduced if it is desired to detect more anomalies, as the risk of obtaining more false positives. The ratio may be increased to reduce the number false positives.

The domain name is marked as suspect at operation 240 if the anomaly probability exceeds the predetermined threshold. If the threshold is not exceeded, the sequence 200 ends at operation 235. The domain name having been marked as suspect, the detector 150 may optionally cause one or more of the following actions to be performed at operation 245: a received data packet related to the generation of the log entry at operation 210 may be discarded by a server 110 having received the data packet and as directed by the detector 150 via the blocker 180, the detector 150 may cause a message such as a text or an email may be sent to a client related to the domain name via the signaling interface 170, the detector 150 may cause an alarm to be provided on the user interface 160 of the service infrastructure 100, and/or the detector 150 may cause the server 110 to block some or all data traffic related to the domain name. In any case, the sequence 200 ends at operation 250.

Figure 3A:
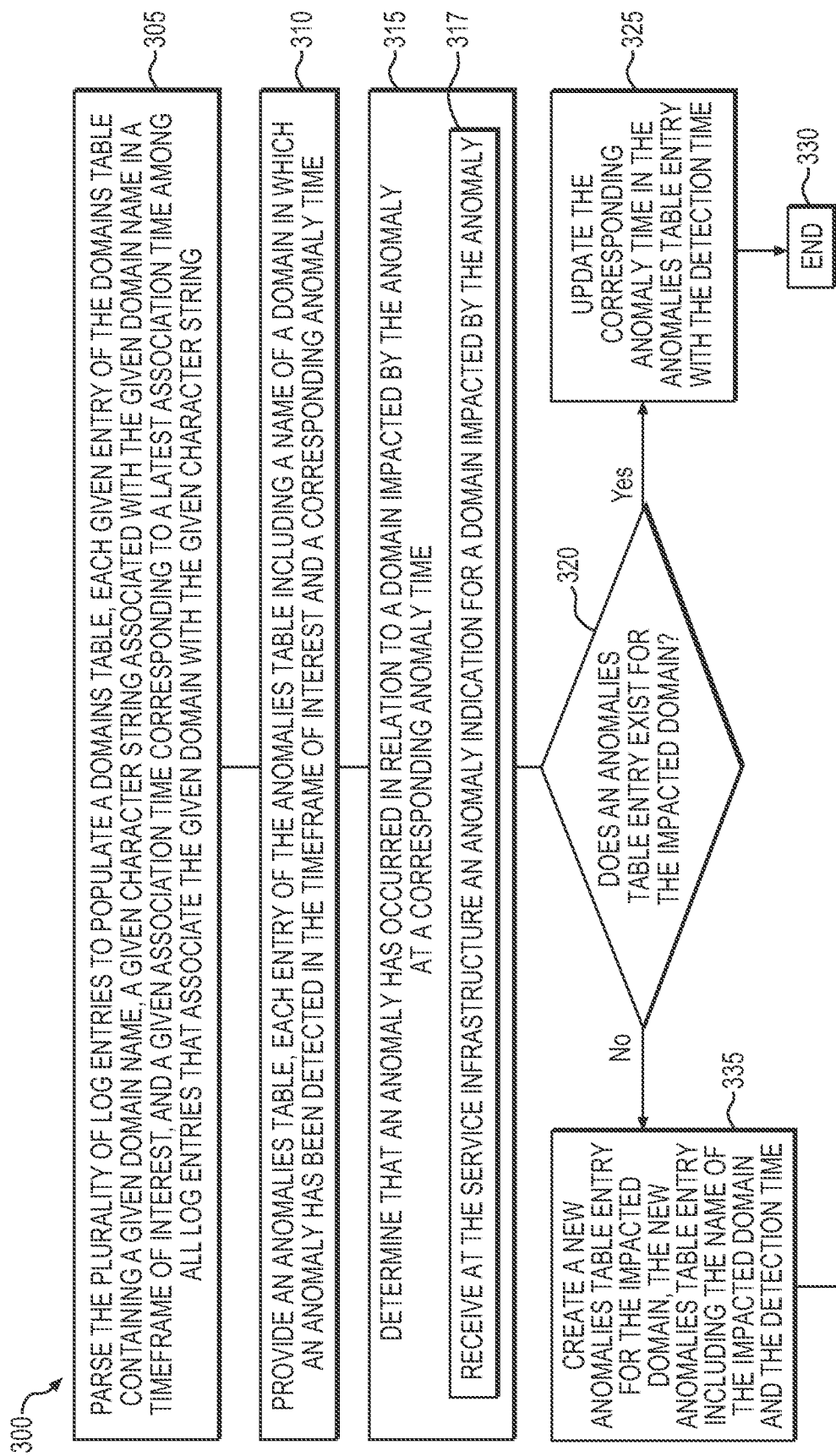
FIGS. 3a and 3b are a sequence diagram showing operations of a method of recording information about a detected anomaly in the service infrastructure in accordance with an embodiment of the present technology.
Figure 3B:
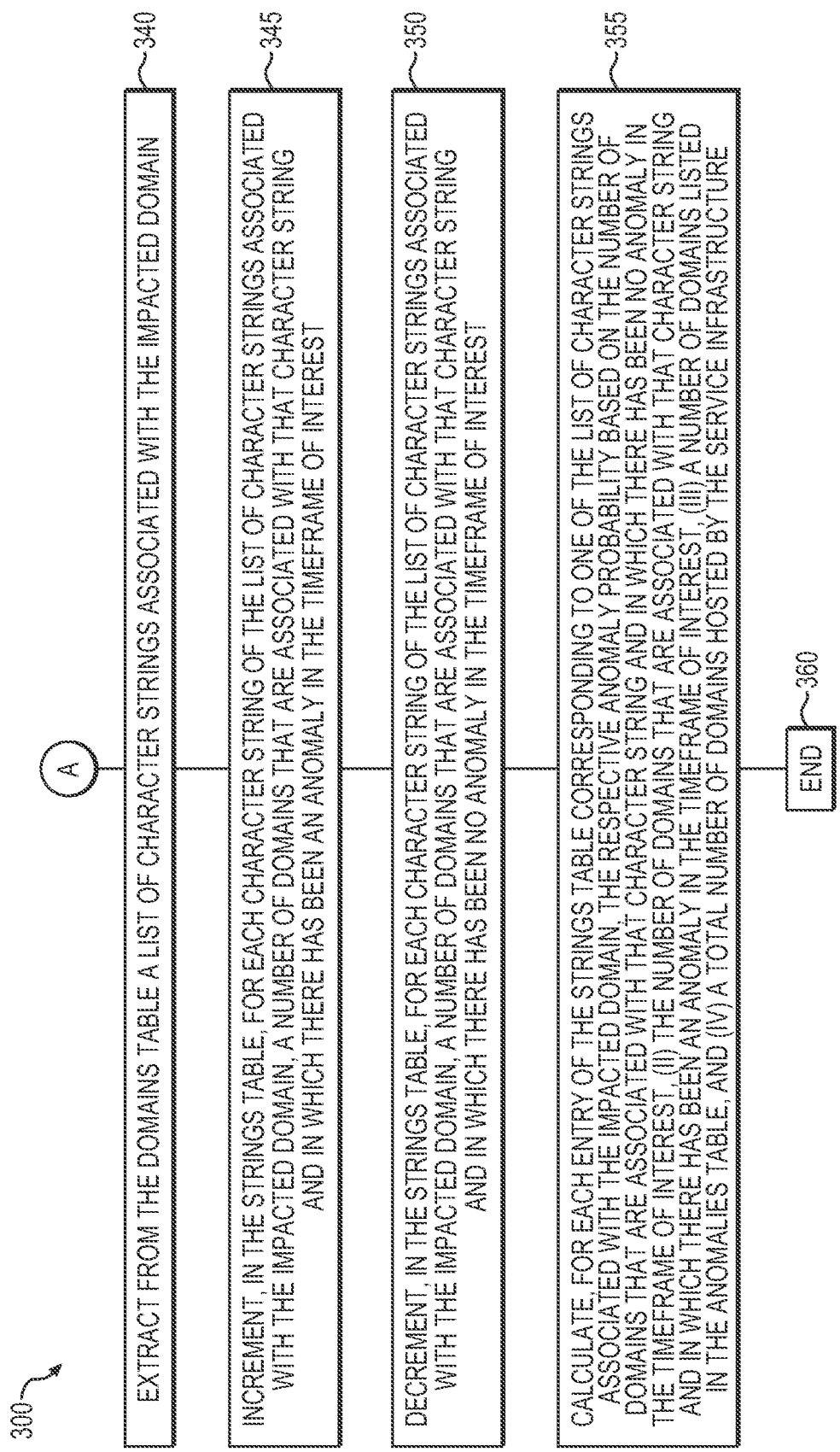

FIGS. 3a and 3b are a sequence diagram showing operations of a method of recording information about a detected anomaly in the service infrastructure in accordance with an embodiment of the present technology. FIGS. 3a and 3b show a sequence 300 comprising a plurality of operations that may be executed in variable order, some of the operations possibly being executed concurrently, some of the operations being optional. At operation 305, the parser 140 may parse the plurality of log entries stored in the database 130 to populate a domains table in which, as shown on Table I, each given entry contains a given domain name, a given character string associated with the given domain name in the timeframe of interest, and a given association time corresponding to a latest association time among all log entries that associate the given domain with the given character string. This operation 305 is optional given that, instead or in addition to operation 305, the domains table may be populated in real time when log entries are generated at operation 210 (FIG. 2). The sequence 300 continues with operation 310 in which the detector 150 provides/accesses an anomalies table in which, as shown on Table II, each entry includes a name of a domain in which an anomaly has been detected in the timeframe of interest and a corresponding anomaly time. The service infrastructure 100 determines that an anomaly has occurred in relation to a domain affected by an anomaly at a corresponding anomaly time at operation 315. The detector 150 may autonomously make this determination. Optionally, the detector 150 may rely on the detection made at operation 230 (FIG. 2) to determine that an anomaly has occurred in the domain name identified in the log entry generated at operation 210 when the anomaly probability corresponding to the character string identified in the same log entry exceeds the predetermined threshold. Alternatively, the detector 150 may receive an anomaly indication for the domain impacted by an anomaly from the detection system 190, via the signaling interface 170, at sub-operation 317.

The detector 150 determines at operation 320 whether or not an anomalies table entry exists for the impacted domain. If so, the detector 150 updates the corresponding anomaly time in the anomalies table entry with the detection time at operation 325 and the sequence ends at operation 330.

If there is no anomalies table entry for the impacted domain, the detector 150 creates a new anomalies table entry for the impacted domain at operation 335. The new anomalies table entry includes the name of the impacted domain and the detection time. The sequence 300 continues on FIG. 3b after operation 335. At operation 340, the detector 150 extracts a list of character strings associated with the impacted domain from the domains table. In the strings table, for each character string of the list of character strings associated with the impacted domain, a number of domains that are associated with that character string and in which there has been an anomaly in the timeframe of interest is incremented by the detector 150 at operation 345. At operation 350, the detector 150 decrements, in the strings table, for each character string of the list of character strings associated with the impacted domain, a number of domains that are associated with that character string and in which there has been no anomaly in the timeframe of interest.

Then at operation 355, for each entry of the strings table corresponding to one of the list of character strings associated with the impacted domain, the detector 150 may calculate the respective anomaly probability based on (i) the number of domains that are associated with that character string and in which there has been no anomaly in the timeframe of interest, (ii) the number of domains that are associated with that character string and in which there has been an anomaly in the timeframe of interest, (iii) a number of domains listed in the anomalies table, and (iv) a total number of domains hosted by the service infrastructure 100. The detector 150 may use a Bayesian filter to calculate the anomaly probabilities. The sequence 300 then ends at operation 360.

In an embodiment, the anomaly probabilities for the character strings associated with the impacted domain may be calculated at regular intervals, the detector 150 executing an optional batch processing of the strings table, instead of following operations 345 and 350. In the same or another embodiment, the anomaly probability for a character string present in a log entry generated at operation 210 (FIG. 2) may also be calculated in real time by the detector 150 while processing the data packet or command.

Figure 4A:
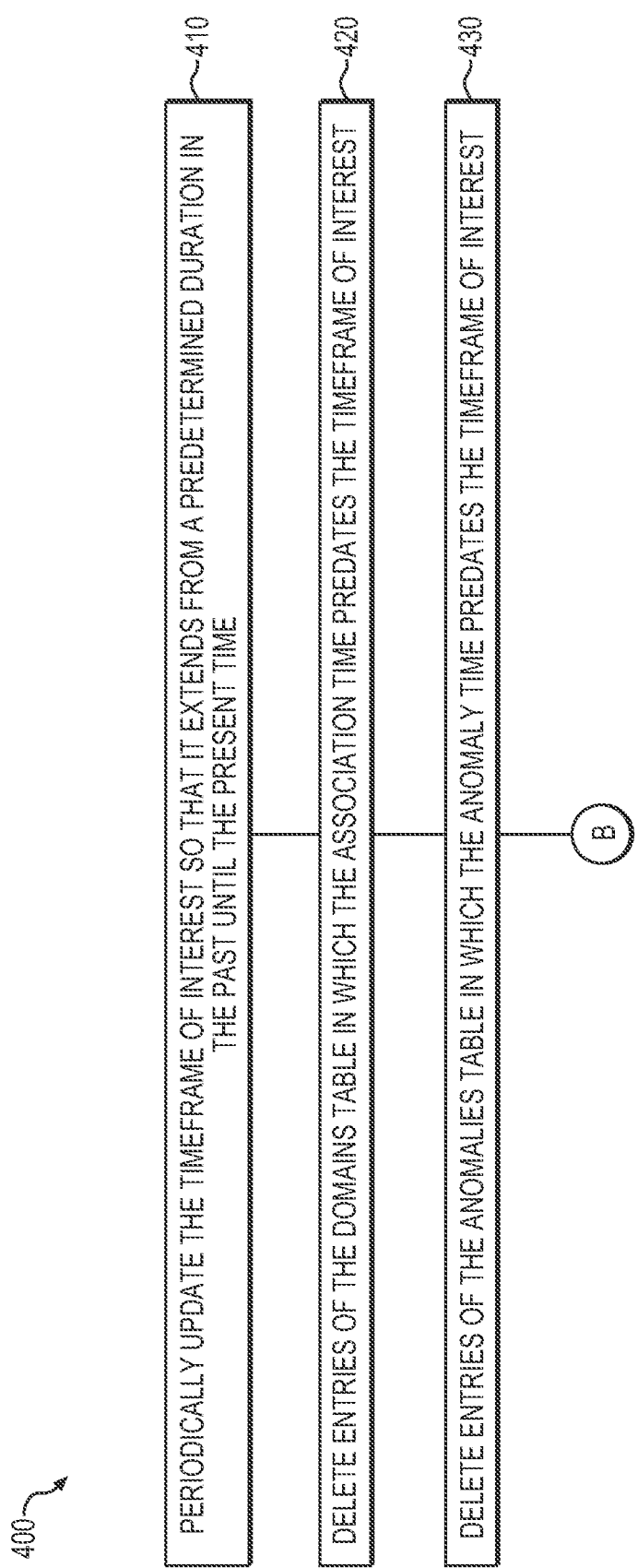

FIGS. 4a and 4b are a sequence diagram showing operations of a method of updating a timeframe of interest for the service infrastructure 100 in accordance with an embodiment of the present technology. FIGS. 4a and 4b show a sequence 400 comprising a plurality of operations that may be executed in variable order, some of the operations possibly being executed concurrently, some of the operations being optional. Whether expressed in minutes, hours, days or months, the timeframe of interest may be viewed as a sliding window that spans between the present up to and until a predetermined time period before the present. This sliding window is updated as the time goes. In a non-limiting example, if the timeframe of interest is expressed in days, its range may be updated once a day. At operation 410, the timeframe of interest is updated so that it extends from a predetermined duration in the past until the present time, this operation being repeated periodically, at regular intervals. The database 130, the parser 140, the detector 150 or any other component of the service infrastructure 100 may update the timeframe of interest. Following the updating of the timeframe of interest, the database 130 or the parser 140 deletes entries of the domains table in which the association time predates the timeframe of interest at operation 420. The database 130 or the detector 150 deletes entries of the anomalies table in which the anomaly time predates the timeframe of interest at operation 430.

Following the updating of the timeframe of interest, the strings table is then repopulated by the database 130 or by the detector 150 according to the updated timeframe of interest at operation 440. Operation 440 may include sub-operations 442, 444 and 446. At sub-operation 442, for each deleted entry of the domains table, a number of domains that are associated with a character string present in the deleted entry and in which there has been an anomaly in the timeframe of interest is decremented in the strings table if an entry of the anomalies table for a domain name present in the deleted entry of the domains table indicates that an anomaly is found in the timeframe of interest for that domain name. At sub-operation 444, for each deleted entry of the domains table, a number of domains that are associated with the character string present in the deleted entry and in which there has been no anomaly in the timeframe of interest is decremented in the strings table if there is no entry of the anomalies table for the domain name present in the deleted entry of the domains table. Then at sub-operation 446, the domains table is scanned to locate entries that contain a domain name extracted from each deleted entry of the anomalies table and, for a located character string of each located entry of the domains table, a number of domains that are associated with the located character string present in the deleted entry of the domains table and in which there has been an anomaly in the timeframe of interest is decremented in the strings table and a number of domains that are associated with the located character string present in the deleted entry of the domains table and in which there has been no anomaly in the timeframe of interest is incremented in the strings table.

Operation 450 may optionally follow operation 440. In operation 450, for each character string associated with one or more of the deleted entries of the domains table, the database 130 or the detector 150 recalculates the anomaly probability based on the same parameters as they now stand following operations 410, 420, 430 and 440, including the number of domains that are associated with that character string and in which there has been no anomaly in the timeframe of interest, the number of domains that are associated with that character string and in which there has been an anomaly in the timeframe of interest, the number of domains listed in the anomalies table, and the total number of domains hosted by the service infrastructure 100. However, in an embodiment, all anomaly probabilities in the strings table may be calculated at regular intervals, in an optional batch processing of the strings table.

Whether or not operation 440 is followed by operation 450, the sequence 400 ends at operation 460.

Figures 5, 6:
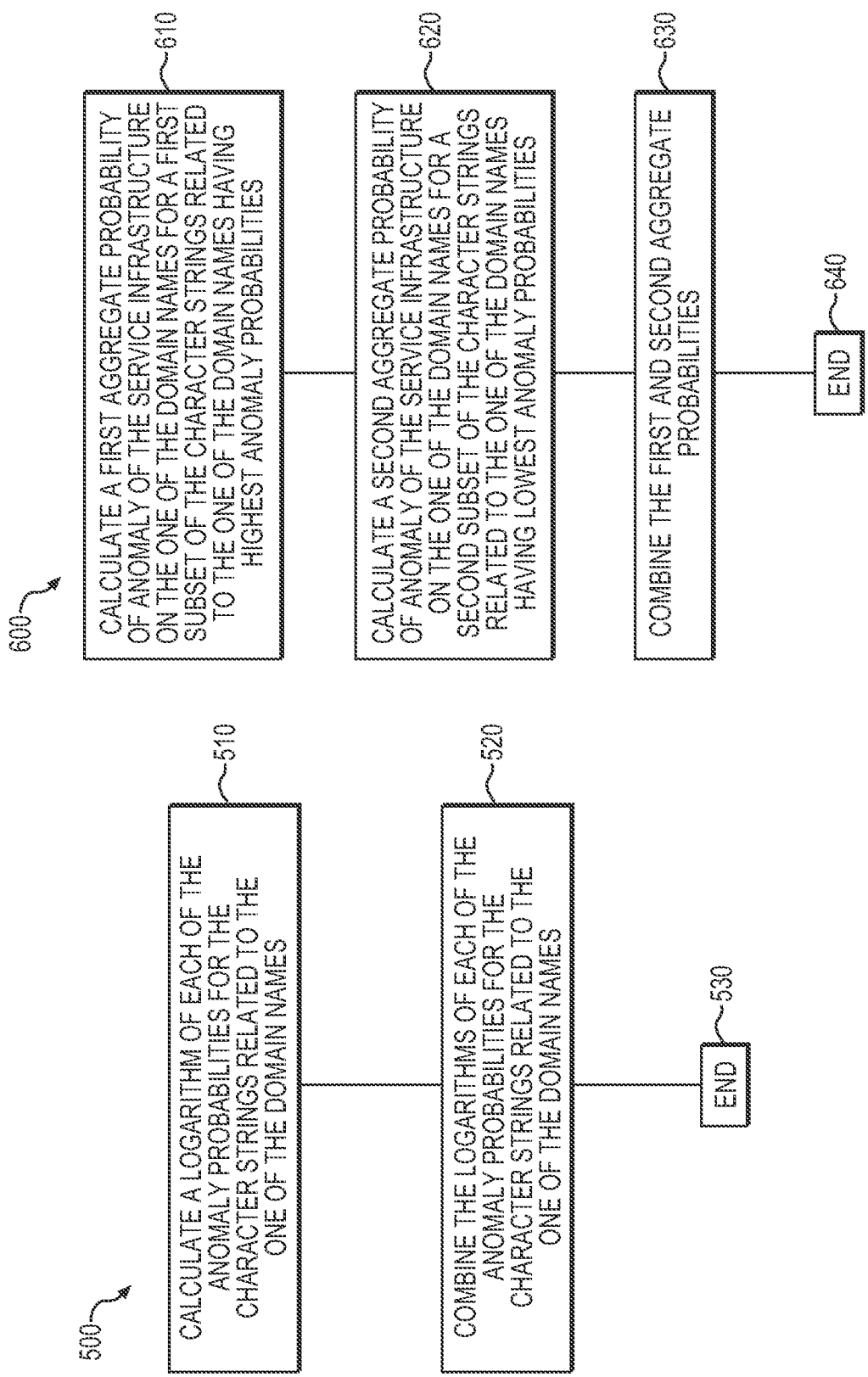
FIG. 5 is a sequence diagram showing operations of a first method for calculating an aggregate probability of anomaly of the service infrastructure in accordance with embodiments of the present technology.
FIG. 6 is a sequence diagram showing operations of a second method for calculating an aggregate probability of anomaly of the service infrastructure in accordance with embodiments of the present technology.

FIG. 5 is a sequence diagram showing operations of a first method for calculating an aggregate probability of anomaly of the service infrastructure 100 in accordance with an embodiment of the present technology. FIG. 5 shows a sequence 500 comprising a plurality of operations that may be executed in variable order, by the detector 150 or by the database 130, some of the operations possibly being executed concurrently, some of the operations being optional. In the sequence 500, which is a first variant for calculating the aggregate probability of anomaly of the service infrastructure 100, operation 510 comprises calculating a logarithm of each of the anomaly probabilities for the character strings related to the one of the domain names. Operation 520 then comprises combining the logarithms of each of the anomaly probabilities for the character strings related to the one of the domain names. The sequence 500 ends at operation 530.

FIG. 6 is a sequence diagram showing operations of a second method for calculating an aggregate probability of anomaly of the service infrastructure 100 in accordance with an embodiment of the present technology. FIG. 6 shows a sequence 600 comprising a plurality of operations that may be executed in variable order, by the detector 150 or by the database 130, some of the operations possibly being executed concurrently, some of the operations being optional. In the sequence 600, which is a second variant for calculating the aggregate probability of anomaly of the service infrastructure 100, operation 610 comprises calculating a first aggregate probability of anomaly of the service infrastructure 100 on the one of the domain names for a first subset of the character strings related to the one of the domain names having highest anomaly probabilities. Operation 620 comprises calculating a second aggregate probability of anomaly of the service infrastructure 100 on the one of the domain names for a second subset of the character strings related to the one of the domain names me having lowest anomaly probabilities. The first and second aggregate probabilities are combined at operation 630. The sequence 600 ends at operation 640.

In an embodiment that encompasses either of the sequences 500 or 600, the domain name identified in the log entry generated at operation 210 of FIG. 2 may be unconditionally marked as not suspect by the detector 150 if the aggregate probability of anomaly of the service infrastructure 100 in relation to the domain name extracted from the data packet or command is lower than a predetermined threshold. The predetermined threshold for this operation may for example be set in the same or equivalent manner as expressed in the above discussion of operation 230.

Each of the operations of the sequences 200, 300, 400, 500 and 600 may be configured to be processed by one or more processors, the one or more processors being coupled to a memory. The memory may include a non-transitory computer-readable medium storing executable code thereon, the executable code comprising instructions for executing any one of the sequences 200, 300, 400, 500 and 600 when the executable code runs on the one or more processors.

Figure 7:
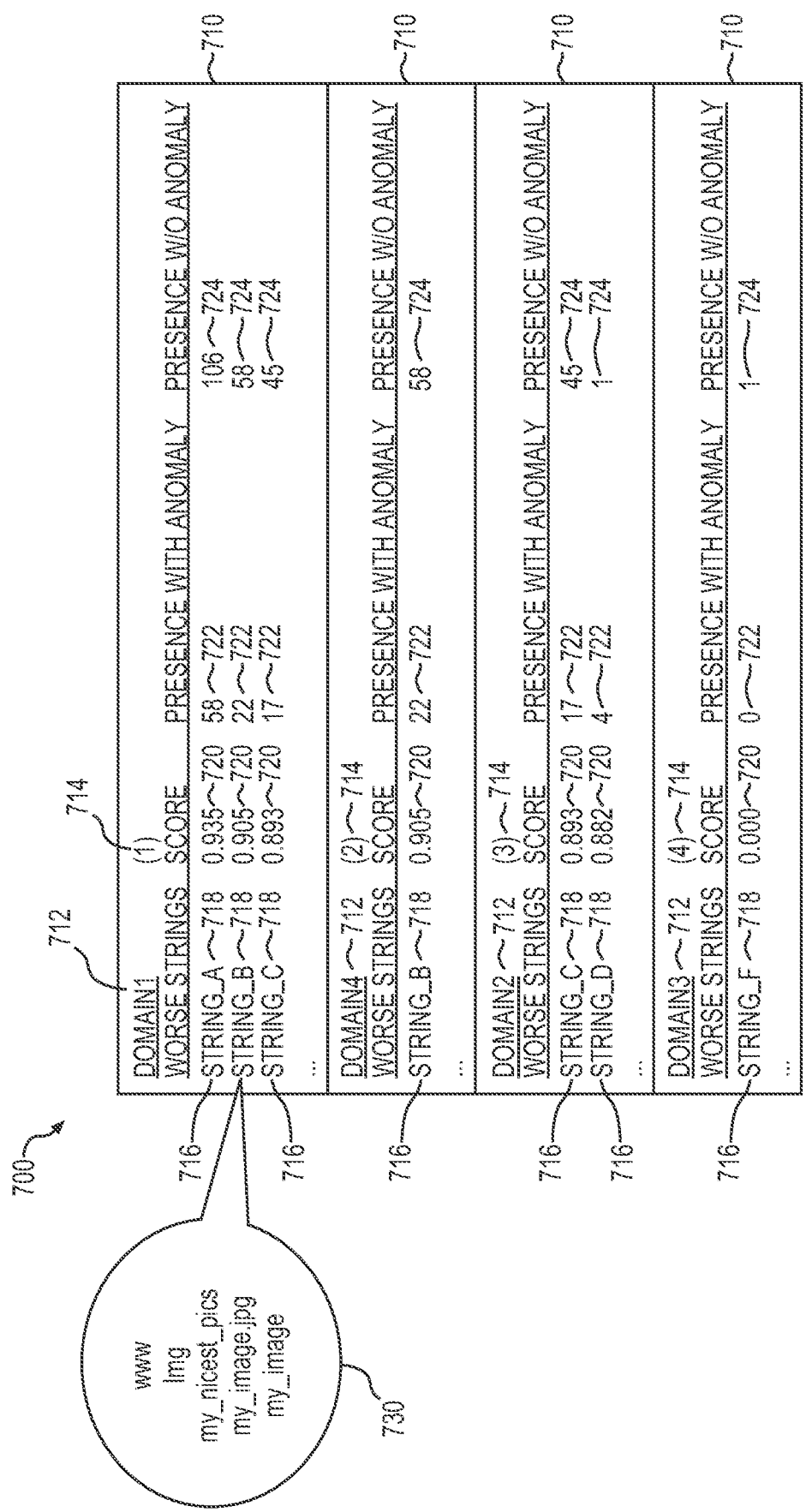
FIG. 7 is a simplified illustration of an operator display summarizing anomaly probabilities for a plurality of hosted domains in accordance with an embodiment of the present technology.

FIG. 7 is a simplified illustration of an operator display summarizing anomaly probabilities for a plurality of hosted domains in accordance with an embodiment of the present technology. The user interface 160 introduced in the description of FIG. 1 may provide, on a display (not shown), a spreadsheet 700 that summarizes the contents of the domains table and of the strings table. As illustrated on FIG. 1, the user interface 160 may access information from the database 130 via the detector 150. In an embodiment, the user interface 160 may be directly connected to the database 130 and fetch therefrom information useful in preparing the spreadsheet 700.

The spreadsheet 700 comprises a table 710 for each of the hosted domains of the service infrastructure 100 and the display may be arranged to provide a partial view of the spreadsheet 700. Although only four (4) domain names are shown on FIG. 7, a larger number of domain names may be displayed in an actual implementation. Each table 710 comprises a domain name 712 and a rank 714. In an embodiment, the rank 714 allows an operator to see which domain name is most affected by anomalies having occurred in the timeframe of interest.

Each row 716 of each table 710 shows a character string 718 that matches the domain name 712 in the domains table and a corresponding score 720 representing the probability p'(A|Str$_i$) for that string 718. In a given table 710, the rows 716 are arranged to list the strings 718 in descending scores 720. The actual number of rows 716 displayed for each domain name may be greater than as illustrated on FIG. 7.

In the example of FIG. 7, which is consistent with the contents of the above Tables I, II and III, String_a has the highest score 720 on the strings table and been present in Domain1. In a non-limiting example, Domain1 is therefore given the first rank (1). String_a is not related to any other domain name in the domains table, so the second rank (2) is given to Domain4, on which String_b has been present, String_b having the second highest score in the strings table. Each row 716 also has a number 722 of presences in domains with anomaly and a number 724 of presences in domains without anomaly, these values and the score 720 being extracted from the strings table.

Returning to the above example in which a domain hosts a folder '/www/img/my_nicest_pics/', distinct sub-strings may have been stored in distinct log entries. In an example shown on FIG. 7, 'String_b' is actually equal to '/www/img/my_nicest_pics/' (in this particular example, the strings field 718 on the second row 716 of the table 710 for Domain1 would actually show '/www/img/my_nicest_pics/'). The operator may select (e.g. click) on the strings

718 field on the second row 716 of the table 710 for Domain1 to cause a display of a window 730 that lists the plurality of sub-strings related to String_b.

It is contemplated that additional fields and information elements may be provided on the spreadsheet 700. For example, each table 710 or a part thereof may be displayed with a color code representing a type of anomaly (e.g. phishing, spamming, etc.) detected on a particular hosted domain. Operator selectable fields may be provided for concurrent display of a number of tables 710, for display of tables 710 for specific domain names, for selecting a number of displayed rows 716 in each table 710, and the like. The rank 714 attributed to each domain name in the various tables 710 may be calculated in other manners, for example based on a plurality of scores 720 on the various rows 716 in a given table 710. Many modifications may be brought to the presentation of the spreadsheet 700 and the illustration of FIG. 7 is not intended to be limiting.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of detecting potential anomalies at a cloud service infrastructure, comprising:
   accessing a strings table, each respective entry of the strings table defining a respective character string and a respective anomaly probability for the character string;
   generating, in a database of the cloud service infrastructure, a log entry related to an event occurring in the cloud service infrastructure, the log entry including a character string designating one of a name of a file and an IP address, the log entry including a domain name hosted by the service infrastructure;
   searching for the character string in the strings table; and
   marking the domain name as suspect when the character string is found in the strings table and when an anomaly probability corresponding to the character string exceeds a predetermined threshold,
   wherein, the predetermined threshold is calculated according to:

$$\text{Threshold} = \operatorname{argmin}_x \left( \frac{\sum_{\text{stringeStrings}} I(p(A \mid \text{Str}_i) < x)}{m} > 0.95 \right)$$

wherein:
   I is an indicator function; and
   m is a number of entries in the strings table.

2. The method of claim 1, further comprising populating a domains table, each given entry of the domains table containing a given domain name, a given character string associated with the given domain name in a timeframe of interest, and a given association time corresponding to a latest association time among all log entries that associate the given domain name with the given character string.

3. The method of claim 2, wherein populating the domains table comprises parsing a plurality of log entries in the database to extract, from each log entry, a respective domain name, a respective character string and a respective association time.

4. The method of claim 2, wherein each respective entry of the strings table further defines (i) a respective number of domains that are associated with the respective character string and in which there has been an anomaly in the timeframe of interest and (ii) a respective number of domains that are associated with the respective character string and in which there has been no anomaly in the timeframe of interest.

5. The method of claim 4, further comprising:
   determining, at the service infrastructure, that an anomaly has occurred at a detection time in relation to an impacted domain;
   accessing an anomalies table, each entry of the anomalies table including a name of a domain in which an anomaly has been detected in the timeframe of interest and a corresponding anomaly time;
   when an anomalies table entry exists for the impacted domain, updating the corresponding anomaly time in the anomalies table entry with the detection time; and
   when no anomalies table entry exists for the impacted domain:
   creating a new anomalies table entry for the impacted domain, the new anomalies table entry including the name of the impacted domain and the detection time,
   extracting from the domains table a list of character strings associated with the impacted domain,
   incrementing, in the strings table, for each character string of the list of character strings associated with the impacted domain, a number of domains that are associated with that character string and in which there has been an anomaly in the timeframe of interest, and
   decrementing, in the strings table, for each character string of the list of character strings associated with the impacted domain, a number of domains that are associated with that character string and in which there has been no anomaly in the timeframe of interest.

6. The method of claim 5, wherein determining that the anomaly has occurred comprises receiving at the service infrastructure an anomaly indication for the impacted domain.

7. The method of claim 5, further comprising:
   periodically updating the timeframe of interest so that it extends from a predetermined duration in the past until the present time; and
   following the updating of the timeframe of interest:
   deleting entries of the domains table in which the association time predates the timeframe of interest,
   deleting entries of the anomalies table in which the anomaly time predates the timeframe of interest, and
   repopulating the strings table according to the updated timeframe of interest.

8. The method of claim 7, wherein repopulating the strings table according to the updated timeframe of interest comprises:
   for each deleted entry of the domains table:
   decrementing in the strings table a number of domains that are associated with a character string present in the deleted entry and in which there has been an anomaly in the timeframe of interest if an entry of the anomalies table for a domain name present in the deleted entry of the domains table indicates that an anomaly is found in the timeframe of interest for that domain name, decrementing in the strings table a number of domains that are associated with the character string present in the deleted entry and in which there has been no anomaly in the timeframe of interest if there is no entry of the anomalies table for the domain name present in the deleted entry of the domains table;

scanning the domains table to locate entries that contain a domain name extracted from each deleted entry of the anomalies table; and for a located character string of each located entry of the domains table:

decrementing in the strings table a number of domains that are associated with the located character string present in the deleted entry of the domains table and in which there has been an anomaly in the timeframe of interest, and incrementing in the strings table a number of domains that are associated with the located character string present in the deleted entry of the domains table and in which there has been no anomaly in the timeframe of interest.

9. The method of claim 5, further comprising calculating, for each respective entry of the strings table, the respective anomaly probability based on (i) the respective number of domains that are associated with the respective character string and in which there has been no anomaly in the timeframe of interest, (ii) the respective number of domains that are associated with the respective character string and in which there has been an anomaly in the timeframe of interest, (iii) a number of domains listed in the anomalies table, and (iv) a total number of domains hosted by the service infrastructure.

10. The method of claim 9, wherein each respective anomaly probability is calculated by applying a Bayesian filter to (i) the respective number of domains that are associated with the respective character string and in which there has been no anomaly in the timeframe of interest, (ii) the respective number of domains that are associated with the respective character string and in which there has been an anomaly in the timeframe of interest, (iii) the number of domains listed in the anomalies table, and (iv) the total number of domains hosted by the service infrastructure.

11. The method of claim 10, further comprising calculating an aggregate probability of anomaly of the service infrastructure in relation to one of the domain names in the domains table by:

calculating a logarithm of each of the anomaly probabilities for the character strings related to the one of the domain names; and combining the logarithms of each of the anomaly probabilities for the character strings related to the one of the domain names.

12. The method of claim 10, further comprising calculating an aggregate probability of anomaly of the service infrastructure in relation to one of the domain names in the domains table by:

calculating a first aggregate probability of anomaly of the service infrastructure on the one of the domain names for a first subset of the character strings related to the one of the domain names having highest anomaly probabilities;

calculating a second aggregate probability of anomaly of the service infrastructure on the one of the domain names for a second subset of the character strings related to the one of the domain names having lowest anomaly probabilities; and combining the first and second aggregate probabilities.

13. The method of claim 11, wherein the domain name present in the generated log entry is unconditionally marked as not suspect if the aggregate probability of anomaly of the service infrastructure in relation to the domain name is lower than a predetermined threshold.

14. The method of claim 2, further comprising:

following marking of the domain name as suspect, performing an action selected from the group consisting of discarding a received data packet related to the generation of the log entry, sending a message to a client related to the domain name, providing an alarm on the service infrastructure, blocking all data traffic related to the domain name, and a combination thereof.

15. A cloud service infrastructure, comprising:

a server configured to receive data packets and/or commands from a client;

a database configured to store a plurality of log entries, each respective log entry of the database including a respective character string associated with a respective domain name;

a processor; and a memory device comprising a non-transitory computer-readable medium storing executable code thereon, wherein, the executable code comprises instructions for executing:

accessing a strings table, each respective entry of the strings table defining a respective character string and a respective anomaly probability for the character string;

generating, in a database of the cloud service infrastructure, a log entry related to an event occurring in the cloud service infrastructure, the log entry including a character string designating one of a name of a file and an IP address, the log entry including a domain name hosted by the service infrastructure;

searching for the character string in the strings table; and marking the domain name as suspect when the character string is found in the strings table and when an anomaly probability corresponding to the character string exceeds a predetermined threshold, wherein, the predetermined threshold is calculated according to:

$$\text{Threshold} = \operatorname{argmin}_x \left( \frac{\sum_{string \in Strings} I(p(A \mid Str_i) < x)}{m} > 0,95 \right)$$

wherein:

l is an indicator function; and m is a number of entries in the strings table.

16. The service infrastructure of claim 15, wherein the processor implements a detector configured to detect that an anomaly has occurred in relation to an impacted domain at a corresponding detection time.

17. The service infrastructure of claim 16, further comprising a user interface operatively connected to the detector, the detector being configured to cause the user interface to issue a warning to an operator of the service infrastructure when the domain name is marked as suspect.

18. The service infrastructure of claim 16, further comprising a signaling interface operatively connected to the detector, the detector being configured to cause the signaling interface to issue a message toward a client related to the domain name when the domain name is marked as suspect.

19. The service infrastructure of claim 16, further comprising a blocker operatively connected to the detector, the detector being configured to cause the blocker to issue a command to the server for discarding a received data packet related to the generation of the log entry when the domain name is marked as suspect.

20. A method of predicting potential anomalies at a service infrastructure, comprising:
   defining a strings table, each respective entry of the strings table defining (i) a respective character string, (ii) a respective number of domains hosted by the service infrastructure that are associated with the respective character string and in which there has been an anomaly in a timeframe of interest, (iii) a respective number of domains hosted by the service infrastructure that are associated with the respective character string and in which there has been no anomaly in the timeframe of interest, and (iv) a respective anomaly probability for the character string;
   generating a plurality of log entries in a database of the service infrastructure, each log entry being related to an event occurring in the service infrastructure, each log entry associating a character string designating one of a name of a file and an IP address with a domain name hosted by the service infrastructure, each log entry also recording a specific association time;
   parsing the plurality of log entries to populate a domains table, each given entry of the domains table containing a given domain name, a given character string associated with the given domain name in a timeframe of interest, and a given association time corresponding to a latest association time among all log entries that associate the given domain with the given character string;
   detecting, at the service infrastructure, an anomaly occurring at a detection time in relation to an impacted domain;
   accessing an anomalies table, each entry of the anomalies table including a name of a domain in which an anomaly has been detected in the timeframe of interest and a corresponding anomaly time;
   when an anomalies table entry exists for the impacted domain, updating the corresponding anomaly time in the anomalies table entry with the detection time; and
   when no anomalies table entry exists for the impacted domain:
   creating a new anomalies table entry for the impacted domain, the new anomalies table entry including the name of the impacted domain and the detection time,
   extracting from the domains table a list of character strings associated with the impacted domain,
   incrementing, in the strings table, for each character string of the list of character strings associated with the impacted domain, a number of domains that are associated with that character string and in which there has been an anomaly in the timeframe of interest, and
   decrementing, in the strings table, for each character string of the list of character strings associated with the impacted domain, a number of domains that are associated with that character string and in which there has been no anomaly in the timeframe of interest.

21. A service infrastructure, comprising:
   a server configured to receive data packets and/or commands from a client;
   a database configured to store a plurality of log entries, each respective log entry of the database including a respective character string associated with a respective domain name;
   a processor; and
   a memory device comprising a non-transitory computer-readable medium storing executable code thereon,
   wherein, the executable code comprises instructions for executing:
   defining a strings table, each respective entry of the strings table defining (i) a respective character string, (ii) a respective number of domains hosted by the service infrastructure that are associated with the respective character string and in which there has been an anomaly in a timeframe of interest, (iii) a respective number of domains hosted by the service infrastructure that are associated with the respective character string and in which there has been no anomaly in the timeframe of interest, and (iv) a respective anomaly probability for the character string;
   generating a plurality of log entries in a database of the service infrastructure, each log entry being related to an event occurring in the service infrastructure, each log entry associating a character string designating one of a name of a file and an IP address with a domain name hosted by the service infrastructure, each log entry also recording a specific association time;
   parsing the plurality of log entries to populate a domains table, each given entry of the domains table containing a given domain name, a given character string associated with the given domain name in a timeframe of interest, and a given association time corresponding to a latest association time among all log entries that associate the given domain with the given character string;
   detecting, at the service infrastructure, an anomaly occurring at a detection time in relation to an impacted domain;
   accessing an anomalies table, each entry of the anomalies table including a name of a domain in which an anomaly has been detected in the timeframe of interest and a corresponding anomaly time;
   when an anomalies table entry exists for the impacted domain, updating the corresponding anomaly time in the anomalies table entry with the detection time; and
   when no anomalies table entry exists for the impacted domain:
   creating a new anomalies table entry for the impacted domain, the new anomalies table entry including the name of the impacted domain and the detection time,
   extracting from the domains table a list of character strings associated with the impacted domain,
   incrementing, in the strings table, for each character string of the list of character strings associated with the impacted domain, a number of domains that are associated with that character string and in which there has been an anomaly in the timeframe of interest, and decrementing, in the strings table, for each character string of the list of character strings associated with the impacted domain, a number of domains that are associated with that character string and in which there has been no anomaly in the timeframe of interest.

* * * * *